United States Patent
Noll

(10) Patent No.: US 12,449,085 B2
(45) Date of Patent: Oct. 21, 2025

(54) DEVICE FOR THE REHABILITATION OF PIPELINES, COMPRISING A SLOPE SENSOR

(71) Applicant: PIPETRONICS GMBH & CO. KG, Rohrbach (DE)

(72) Inventor: Christian Noll, Limburgerhof (DE)

(73) Assignee: Pipetronics GmbH & Co. KG, Rohrbach (DE)

( * ) Notice: Subject to any disclaimer, the term of this patent is extended or adjusted under 35 U.S.C. 154(b) by 120 days.

(21) Appl. No.: 17/453,845

(22) PCT Filed: May 5, 2020

(86) PCT No.: PCT/DE2020/100372
§ 371 (c)(1),
(2) Date: Feb. 2, 2022

(87) PCT Pub. No.: WO2020/224723
PCT Pub. Date: Nov. 12, 2020

(65) Prior Publication Data
US 2023/0194037 A1     Jun. 22, 2023

(30) Foreign Application Priority Data

May 7, 2019   (DE) .................. 10 2019 111 885.9

(51) Int. Cl.
*F16L 55/48*     (2006.01)
*F16L 55/179*    (2006.01)
(Continued)

(52) U.S. Cl.
CPC ............. *F16L 55/48* (2013.01); *F16L 55/179* (2013.01); *F16L 55/265* (2013.01); *F16L 2101/10* (2013.01)

(58) Field of Classification Search
CPC ....... F16L 55/48; F16L 55/179; F16L 55/265; F16L 2101/10; B08B 9/0551; E03F 2003/065
(Continued)

(56) References Cited

U.S. PATENT DOCUMENTS 4,197,908 A * 4/1980 Davis .................. E03F 3/06
                                                    166/50
5,105,882 A * 4/1992 Ralston ............... B23B 51/105
                                                    408/1 R
(Continued)

FOREIGN PATENT DOCUMENTS

DE          3737301 A1    5/1989
DE     102010044465 A1    3/2012
(Continued)

OTHER PUBLICATIONS

International Search Report/Written Opinion issued on Oct. 15, 2020 in PCT/DE2020/100372.

*Primary Examiner* — David R Deal
(74) *Attorney, Agent, or Firm* — Rivkin Radler LLP

(57) ABSTRACT

The invention relates to a clearing device for the rehabilitation of a pipeline, especially for clearing a branching-off in a pipeline system rehabilitated by means of a tubular liner, comprising at least one clearing device, which is movably mounted by at least one degree of freedom, and a slope sensor located on the clearing device.

9 Claims, 1 Drawing Sheet

(51) Int. Cl.
*F16L 55/26* (2006.01)
*F16L 101/10* (2006.01)

(58) Field of Classification Search
USPC .................................. 138/98, 97; 405/184.2
See application file for complete search history.

(56) References Cited

U.S. PATENT DOCUMENTS

| | | | | |
|---|---|---|---|---|
| 5,150,056 | A * | 9/1992 | Wilcock | F16L 55/265 |
| | | | | 324/226 |
| 5,197,540 | A * | 3/1993 | Yagi | F16L 55/179 |
| | | | | 408/21 |
| 5,651,638 | A * | 7/1997 | Heggerud | F16L 55/48 |
| | | | | 405/154.1 |
| 6,092,406 | A * | 7/2000 | Rajagopalan | F16L 55/48 |
| | | | | 72/17.2 |
| 9,016,322 | B2 | 4/2015 | Vogt et al. | |
| 2001/0010780 | A1 * | 8/2001 | Matsumoto | F16L 55/265 |
| | | | | 175/26 |
| 2006/0074525 | A1 | 4/2006 | Close et al. | |
| 2009/0085582 | A1 * | 4/2009 | Sinha | F16L 55/48 |
| | | | | 324/644 |
| 2014/0169886 | A1 * | 6/2014 | Rogers | F16L 55/265 |
| | | | | 405/184.2 |
| 2020/0173599 | A1 | 6/2020 | Baxter et al. | |
| 2020/0252139 | A1 * | 8/2020 | Poe | H04B 7/15 |
| 2022/0252200 | A1 * | 8/2022 | DeKyspotter | F16L 55/30 |

FOREIGN PATENT DOCUMENTS

| | | |
|---|---|---|
| KR | 20170122325 A | 11/2017 |
| WO | 9117325 A1 | 11/1994 |
| WO | 2020113125 A1 | 6/2020 |

* cited by examiner

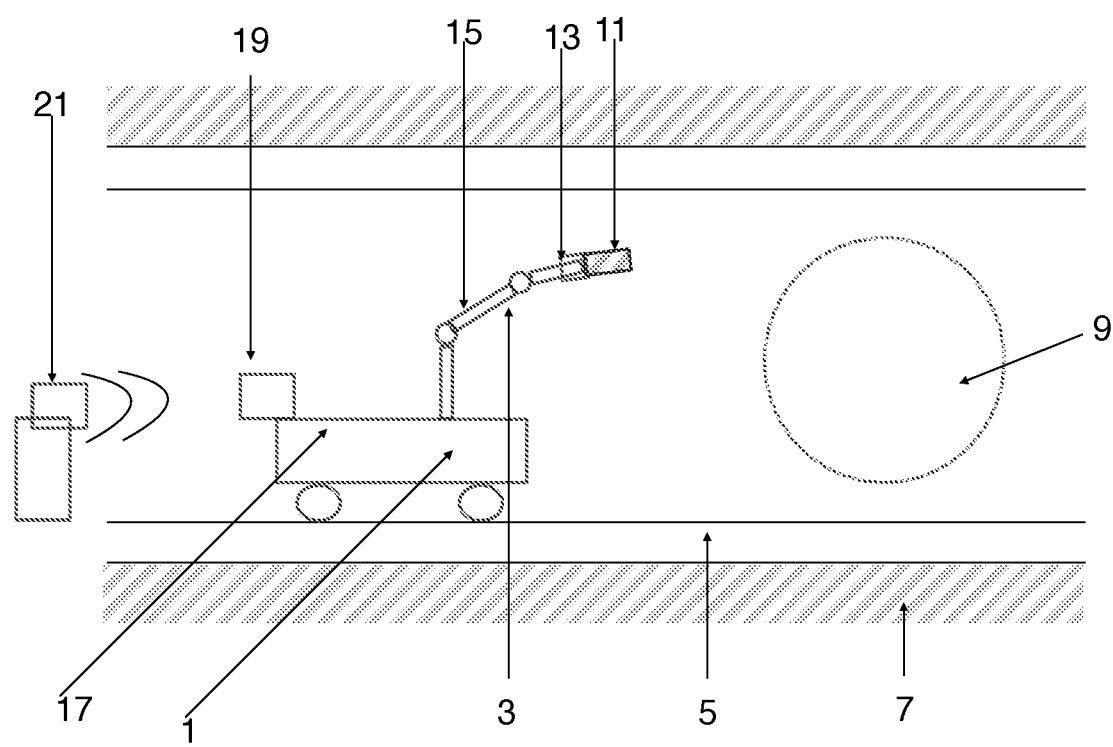

DEVICE FOR THE REHABILITATION OF PIPELINES, COMPRISING A SLOPE SENSOR

CROSS-REFERENCE TO RELATED APPLICATION(S)

The present application is the U.S. National Stage Application under 35 U.S.C. § 371 of International Application no. PCT/DE2020/100372, filed on May 5, 2020, which claims the benefit of priority to DE Application No. 10 2019 111 885.9, filed on May 7, 2019. Each of the foregoing applications is hereby incorporated by reference in their entirety, for all purposes.

FIELD OF THE DISCLOSURE

The present invention relates to a system for attaching a device for locating a mobile device by means of a radar system, comprising a base station and an active transponder attached to the device.

BACKGROUND

Methods for rehabilitating pipeline systems in which, for example, liquid or gaseous media are transported, are known and described many times in the prior art.

For example, methods are known in which the sections of the pipeline system having a defect or damage are replaced by new sections. However, this is complicated and also not always possible.

Furthermore, methods are known in the prior art in which, for the rehabilitation of pipeline systems, for example of sewers and similar pipe systems, a flexible, curable layer impregnated with a curable resin, which serves as a tubular liner, also designated as a liner, is inserted into the pipeline system. Following the insertion, the tubular liner is widened, so that it clings tightly to the inner wall of the pipeline system. The resin is then cured.

The production of such a tubular liner is described, for example, in WO 95/04646. Such a tubular liner usually has an opaque outer protective film, an inner film that is permeable at least to specific wavelength ranges of electromagnetic radiation, and a curable layer impregnated with a resin, which is arranged between the inner film and the outer film.

The outer film tube is intended to prevent the resin used for the impregnation from escaping from the curable layer and reaching the environment. This assumes good tightness and attachment of the outer film tube to the resin-impregnated curable layer.

WO 00/73692 A1 discloses a tubular liner comprising an inner film tube, a fibrous strip impregnated with a resin as a curable layer and an outer tube which, on its inner side, is laminated with a fiber nonwoven.

The tubular liners are inserted into the pipeline system to be rehabilitated before being cured and are inflated by means of a fluid, as a rule compressed air. For the inflation of the tubular liner, an open end of the tubular liner has compressed air applied thereto, according to the prior art, and the opposite open end of the tubular liner is closed with a closure device, a so-called packer. This closure device comprises a hollow cylinder and a covering element, with which the hollow cylinder can be closed.

A curing device is inserted into the tubular liner to cure the same, having a radiation source and being guided through the tubular liner in order to activate or perform the curing of the curable layers of the tubular layer with the radiant energy. Complete curing of the tubular liner is of great importance, i.e. it is necessary for a specific amount of radiant energy to be introduced into the tubular liner at every point of the same. The amount of radiant energy depends on the power output of the radiant sources and on the speed with which the latter are guided through the tubular liner.

To regulate the curing, it is therefore important to know the position of the curing device, in order to control the discharge of the radiant energy.

Furthermore, pipeline systems generally comprise supply lines or secondary sewers. These must be cleared again after the tubular liner has been pulled in and cured. For this purpose, use is generally made of devices which comprise a robot arm with a drilling or milling device attached thereto.

For the metrological detection of pipelines and in particular for the determination of the position of the branches, measuring devices according to the prior art are usually inserted into the pipeline before the tubular liner is pulled in, wherein the measuring device is moved through a pipeline to be rehabilitated either independently or with the aid of a cable, in particular a cable comprising Kevlar fibers and/or at least one pull rope, and/or a pull rope.

The measuring device according to the prior art detects the position of the branches, normally via optical sensors, in particular camera recordings, before the tubular liner is drawn in.

In the following, the term branches is to be understood broadly and comprise side inlets, also designated as pipe inlets or pipe branches. If a branch is detected, to determine the position of the branch in the pipeline, use is made either of a rotational speed sensor, which counts the number of rotations of the wheels of the measuring device, the measurement of the length of the cable or pull rope, or a measuring tape carried along by the curing device.

However, the position of the branch must be detected not only on the basis of its distance to one or both open ends of the pipeline but also in terms of its angular position. For this purpose, for example, rotational angle sensors or gravitational sensors are used.

The problem here is that the position of the branch must be reproducibly determinable. After the tubular liner has been drawn in and the same has been cured, a clearing device is inserted into the pipeline. This clearing device is then moved to the detected position of the recess. Both during the first travel through the pipeline by the measuring device and also during travel through the rehabilitated pipeline with the clearing device, errors can occur in the position determination of the respective devices: spinning wheels which prevent movement of the device although the rotational speed sensors detect propulsion, cables or pull ropes running crookedly, devices twisted relative to themselves, non-identical positionings with reference to the center point of the pipelines, etc.

It is particularly important that the positions of the branches are detected with the maximum precision. Even minimal deviations can lead to damage to the branching line and/or endanger the tightness of the pipeline system. Because of the multiplicity of possible error sources during the detection of the position of a cutout and moving to the same again after a tubular liner has been pulled in, production of cutouts to clear the branches is therefore carried out manually. To this end, firstly, with a safety margin from the walls of the branch, a first cutout is made and this first cutout is then lengthened manually until the wall of the branch is reached. The branch is then cleared further.

To detect the position, radar systems for measuring a distance and a speed of an object are known. For the measurement, a transponder is attached to the object. To measure the distance and/or the speed, a signal is transmitted from a base station of the radar system to the transponder. In the transponder, the signal is frequency-modulated and, following the modulation, is transmitted back to the base station. By using an evaluation operation, the distance and the speed of the object can be evaluated. In addition to frequency modulation, amplitude modulation is also known.

DE 10 2005 059 507 A1 teaches a method for a radar system in which an unmodulated signal is transmitted from a base station to a transponder. This signal is phase-modulated by the transponder and transmitted back to the base station in a passive manner. Such a method is highly influenced by backscattering objects, with the result that the signal transmitted back has a high level of noise. In addition, the range of passive measuring systems is highly limited.

Even if the position of a clearance device in the pipeline with respect to a fixed reference point can be determined with sufficient accuracy, then it is also possibly necessary for the inclination of the clearing device itself in the pipeline to be detectable.

The object of the present invention is therefore to overcome the disadvantages of the prior art and in particular to permit precise clearance of branches by a user in pipelines rehabilitated with tubular liners. For a clearance, it is also necessary to move to the angular position exactly once more, which means that the inclination of the device relative to the pipeline must be detected, in particular with reference to the milling head.

This object is achieved by a clearing device for rehabilitating a pipeline, in particular for clearing a branch in a pipeline system rehabilitated with a tubular liner, comprising a clearance device, which is movably mounted in at least one degree of freedom, and an inclination sensor arranged on the clearance device.

The prior art already discloses clearing devices which have an angle of inclination in the base unit itself and, for example via angle sensors, calculate how the clearing device is aligned relative to the ground.

However, this has the disadvantage in particular that the sensors or the calculation can be incorrect.

The invention was based on the surprising finding that integration of the inclination sensor into the clearance device itself gives information directly about the angle at which this is arranged relative to the pipeline to be rehabilitated.

Thus, a real determination of the angle of inclination of the clearance device is possible and not just an indirectly calculated position determination. The solution according to the invention can be implemented more reliably and more simply and supplies more exact results than the previous solutions.

SUMMARY

Provision can be made for an electronic sensor device for detecting the instantaneous position of the clearance device relative to a base unit of the clearing device to be included.

Such an electronic sensor unit can be used, for example, to detect the horizontal and/or vertical position of the clearance device. This can be done indirectly from the calculated movement of the motors of the movement element, for example a robot arm, to which the clearance device is attached. Alternatively, a distance sensor can also be included, which detects the vertical distance to the inner wall of the pipeline, to the base unit of the clearance device or another reference point. This applies at the same time to the horizontal position which, according to the invention, can in particular likewise be calculated indirectly or measured relative to the base unit.

Provision can be made in particular for an electronic evaluation device to be included, which is set up to evaluate the data detected by the inclination sensor and the electronic sensor device to determine a position of the clearance device in the pipeline.

Furthermore, provision can be made for a distance measuring device to be included, which detects the distance of the clearing device to a reference point in the pipeline.

Here, the reference point selected is preferably a point on or in the vicinity of the open ends of the pipeline which, at the same time, is used to measure the pipeline and for the subsequent rehabilitation and clearance.

It may be advantageous that the distance measuring device is constructed in two parts, wherein a first transmitter and receiver module is arranged on the clearing device, and a second transmitter and receiver module interacting with the first transmitter and receiver module is arranged in the pipeline system at a reference point.

In particular, it may be advantageous that the distance measuring device comprises a radar system, wherein the radar system transmits a first signal from the second transmitter and receiver module, which signal, modulated by the first transmitter and receiver module, is sent back to the second transmitter and receiver module, wherein the position of the clearing device in the pipeline is determined from the signal propagation time.

As already explained, position determination along the length of a pipeline is difficult. However, according to the invention it has been shown that such a precise position determination is possible if use is made of an active unit which, particularly preferably, interact with one another in the form of transmitting and receiving modules.

It has proven to be particularly advantageous if use is made of a radar system which uses modulated signals, in order to calculate out interference effects from the environment.

According to one embodiment of the present invention, provision can also additionally be made for the clearance device to comprise or form a milling or drilling tool.

Finally, provision can be made for the base unit to comprise wheels or chains, which are driven by means of one or more electric motors.

According to one embodiment, the invention also supplies a clearing device in which the clearance device of the clearing device comprises an optionally rotatable robot arm which is movable in at least two, in particular three, spatial axes, at the free end of which the milling or drilling tool is arranged, and which in particular can be folded in and/or comprises at least one telescopic arm element.

a) According to the invention, a method for clearing an area of a pipeline, in particular a branch of a pipeline system rehabilitated with a tubular liner is also supplied, which comprises the following steps, in particular in this order:

b) providing a clearing device according to the invention in the rehabilitated pipeline and arranging the clearing device in front of the area in which material is to be removed, in particular in front of the branch to be cleared;

c) detecting the position of the clearance device of the clearing device relative to the inner wall of the branch by means of an evaluation of the inclination sensor in the clearance device and the instantaneous position of the clearance device relative to a base unit of the clearing device by means of an electronic evaluation device;

d) clearing the branch by means of the clearance device on the basis of the detected position of the clearance device relative to the inner wall of the branch.

Further features and advantages of the invention can be gathered from the following description, in which an exemplary embodiment of the invention is explained by way of example with reference to a schematic drawing, without restricting the invention as a result.

IN THE DRAWING

FIG. 1 shows a schematic sectional view of a clearing device in the interior of a pipeline rehabilitated with a tubular liner according to one embodiment of the present invention.

DETAILED DESCRIPTION

In the FIGURE, an embodiment of a clearing device 1 according to the invention for clearing a branch 9 in a pipeline system 7 rehabilitated with a tubular liner 5 is shown. The clearing device 1 comprises a clearance device 3, which comprises an inclination sensor 13 arranged adjacent to its free end, which is designed and set up to detect the inclination of the clearance device 3.

At the free and of the clearance device 3, a distance measuring device, not shown, can be provided, which measures the distance of the clearance device 3 to the base unit 17 in the vertical and horizontal direction. Alternatively, this distance can be calculated.

Furthermore, the clearance device comprises a milling tool 11 in order to clear the branch 9. As shown in the FIGURE, the clearance device further comprises a rotatable robot arm 15 which is movable around three spatial axes, at the free end of which the milling tool 11 is arranged. Alternatively, a milling tool movably mounted in one or two spatial axes can also be provided.

Also included is a distance measuring device 19, 21, which is constructed in two parts. A first transmitter and receiver module 19 is arranged on the clearing device, and a second transmitter and receiver module interacting with the first transmitter and receiver module is arranged in the pipeline system at a reference point.

Preferably, the second transmitting and receiving module 21 transmits a radar signal which, modulated by the first transmitting and receiving module, is evaluated to determine the position of the clearing device 1 in the pipeline.

The features of the invention described in the previous description and the claims can be important both on their own and also in any desired combination for the implementation of the invention in its various embodiments.

The invention claimed is:

1. A clearing device for rehabilitating a pipeline by clearing a branch in a pipeline system rehabilitated with a tubular liner, comprising:
   a clearance clearing device movably mounted in at least one degree of freedom and an inclination sensor arranged on the clearance device; and
   a radar distance measuring device, which detects the distance of the clearing device to a reference point in the pipeline.

2. The clearing device as claimed in claim 1, further comprising:
   an electronic sensor device for detecting the instantaneous position of the clearance device relative to a base unit of the clearing device.

3. The clearing device as claimed in claim 2, characterized in that:
   an electronic evaluation device is included, which is set up to evaluate the data detected by the inclination sensor; and
   the electronic sensor device to determine a position of the clearance device in the pipeline.

4. The clearing device as claimed in claim 1, characterized in that:
   the radar distance measuring device is constructed in two parts, wherein a first transmitter and receiver module is are arranged on the clearing device; and
   a second transmitter and receiver module interacting with the first transmitter and receiver module is arranged in the pipeline system at a reference point.

5. The clearing device as claimed in claim 1, characterized in that:
   the radar distance measuring device comprises:
   a radar system, wherein the radar system transmits a first signal from the second transmitter and receiver module, which signal, modulated by the first transmitter and receiver module, is sent back to the second transmitter and receiver module, wherein the position of the clearing device in the pipeline is determined from the signal propagation time.

6. The clearing device as claimed in claim 1, characterized in that:
   the clearance device comprises or forms a milling or drilling tool.

7. The clearing device as claimed in claim 1, characterized in that:
   the base unit comprises wheels or chains, which are driven by means of one or more electric motors.

8. The clearing device as claimed in claim 1, characterized in that:
   the clearance device of the clearing device comprises an optionally rotatable robot arm which is movable in at least two, in particular three, spatial axes, at the free end of which the milling or drilling tool is arranged, and which in particular can be folded in.

9. A method for clearing an area of a pipeline, having a branch of a pipeline system rehabilitated with a tubular liner, which comprises the following steps, in particular in this order:
   a) providing a clearing device according to claim 1 in the rehabilitated pipeline and arranging the clearing device in front of the area in which material is to be removed, in particular in front of the branch to be cleared;
   b) detecting the position of the clearance device of the clearing device relative to the inner wall of the branch by means of an evaluation of the inclination sensor in the clearance device and the instantaneous position of the clearance device relative to a base unit of the clearing device by means of an electronic evaluation device; and
   c) clearing the branch by means of the clearance device on the basis of the detected position of the clearance device relative to the inner wall of the branch.

* * * * *